United States Patent
Waite et al.

(10) Patent No.: US 9,957,815 B2
(45) Date of Patent: May 1, 2018

(54) GAS POWERED TURBINE COMPONENT INCLUDING SERPENTINE COOLING

(71) Applicant: United Technologies Corporation, Hartford, CT (US)

(72) Inventors: Ryan Alan Waite, South Windsor, CT (US); Benjamin F. Hagan, Manchester, CT (US)

(73) Assignee: United Technologies Corporation, Farmington, CT (US)

(*) Notice: Subject to any disclaimer, the term of this patent is extended or adjusted under 35 U.S.C. 154(b) by 369 days.

(21) Appl. No.: 14/639,165

(22) Filed: Mar. 5, 2015

(65) Prior Publication Data
US 2016/0258300 A1   Sep. 8, 2016

(51) Int. Cl.
F01D 5/18 (2006.01)
F01D 9/06 (2006.01)
F01D 25/12 (2006.01)

(52) U.S. Cl.
CPC ............ *F01D 5/188* (2013.01); *F01D 5/185* (2013.01); *F01D 5/186* (2013.01); *F01D 5/187* (2013.01); *F01D 9/065* (2013.01); *F01D 25/12* (2013.01); *F05D 2250/185* (2013.01); *Y02T 50/676* (2013.01)

(58) Field of Classification Search
CPC .......... F01D 5/188; F01D 5/185; F01D 5/186; F01D 9/065; F01D 25/12
USPC ........................................................ 415/115
See application file for complete search history.

(56) References Cited

U.S. PATENT DOCUMENTS

| 4,930,980 A | * | 6/1990 | North | F01D 5/188 |
| | | | | 415/115 |
| 5,511,309 A | | 4/1996 | Beabout | |
| 5,640,767 A | | 6/1997 | Jackson et al. | |
| 5,669,759 A | | 9/1997 | Beabout | |
| 5,813,835 A | * | 9/1998 | Corsmeier | F01D 5/186 |
| | | | | 415/115 |

(Continued)

FOREIGN PATENT DOCUMENTS

| EP | 1783327 | 5/2007 |
| JP | 2001173404 | 6/2001 |
| WO | 2014137686 | 9/2014 |

OTHER PUBLICATIONS

European Search Report for Application No. 16158547.6 dated Aug. 4, 2016.

*Primary Examiner* — Woody Lee, Jr.
*Assistant Examiner* — Theodore Ribadeneyra
(74) *Attorney, Agent, or Firm* — Carlson, Gaskey & Olds, P.C.

(57) ABSTRACT

A flow path component for a gas powered turbine includes a flow path component body having cross sectional profile having a leading edge and a trailing edge. The leading edge is connected to the trailing edge by a first side and by a second side opposite the first side. A serpentine cooling passage includes a plurality of segments, each of the segments being generally radially aligned. A first subset of the segments is disposed along one of the first side and the second side of the cross sectional profile, and a second subset of the segments spans the flow path component body from the first side to the second side. A cavity is positioned internal to the flow path component body. The cavity is at least partially shielded from one of the first side and the second side by at least one of the plurality of segments.

18 Claims, 3 Drawing Sheets

(56) References Cited

U.S. PATENT DOCUMENTS

| | | | |
|---|---|---|---|
| 5,820,337 A * | 10/1998 | Jackson | C22C 32/00 |
| | | | 415/200 |
| 6,142,730 A * | 11/2000 | Tomita | F01D 5/187 |
| | | | 415/114 |
| 7,033,136 B2 * | 4/2006 | Botrel | F01D 5/187 |
| | | | 415/115 |
| 7,241,107 B2 | 7/2007 | Spanks, Jr. et al. | |
| 7,458,778 B1 | 12/2008 | Liang | |
| 7,481,622 B1 | 1/2009 | Liang | |
| 7,527,474 B1 | 5/2009 | Liang | |
| 7,717,675 B1 | 5/2010 | Liang | |
| 7,870,743 B2 * | 1/2011 | Lee | F01D 5/189 |
| | | | 416/96 R |
| 8,444,381 B2 | 5/2013 | Seely | |
| 2005/0025623 A1 * | 2/2005 | Botrel | F01D 5/187 |
| | | | 416/97 R |
| 2008/0019840 A1 | 1/2008 | Cunha | |
| 2011/0236206 A1 | 9/2011 | Seely | |

* cited by examiner

GAS POWERED TURBINE COMPONENT INCLUDING SERPENTINE COOLING

STATEMENT REGARDING FEDERALLY SPONSORED RESEARCH OR DEVELOPMENT

This invention was made with government support under Contract No. FA 8650-09-D-2923-0021 awarded by the United States Air Force. The Government has certain rights in this invention.

TECHNICAL FIELD

The present disclosure relates generally to flow path spanning components in a gas turbine engine, and more specifically to serpentine cooling passages in the same.

BACKGROUND

Gas powered turbines, such as those used in commercial turbine engines, utilize a compressor section to compress air, a combustor section to mix the compressed air with a fuel and ignite the mixture, and a turbine section to expand the resultant combustion gasses. The expansion of the resultant combustion gasses across the turbine section drives the turbine section to rotate. The turbine section is connected to the compressor section via a shaft, and rotation of the turbine section in turn drives the compressor section to rotate.

The compressor section, combustor section, and turbine section are interconnected via a primary flow path that provides a gas path through each of the sections. Within the flow path in each of the compressor section and the turbine section are multiple flow correcting vanes, rotors and stators. The flow correcting vanes, rotors and stators have an airfoil profile designed to impart desirable flow characteristics on the fluid flowing through the flow path. Further include throughout the flow path are multiple additional flow path components that span, or partially span, the flow path. The combustion gasses flowing through the turbine section are at high temperatures and expose the corresponding flow path components to high temperatures. To prevent damage resulting from this exposure, in some examples the flow path components are actively cooled using cooling flow paths contained within the flow path component.

SUMMARY OF THE INVENTION

In one exemplary embodiment a flow path component for a gas powered turbine includes a flow path component body having cross sectional profile having a leading edge and a trailing edge, the leading edge being connected to the trailing edge by a first side and being connected to the trailing edge by a second side opposite the first side, a serpentine cooling passage including a plurality of segments, each of the segments being generally radially aligned, wherein a first subset of the segments disposed along one of the first side and the second side of the cross sectional profile, and a second subset of the segments spans the flow path component body from the first side to the second side, and a cavity internal to the flow path component body, wherein the cavity is at least partially shielded from one of the first side and the second side by at least one of the plurality of segments.

In another exemplary embodiment of the above described flow path component for a gas powered turbine, the cross sectional profile is an airfoil profile, and the first side of the cross sectional profile is a suction side and the second side of the cross sectional profile is a pressure side.

In another exemplary embodiment of any of the above described flow path components for a gas powered turbine, the first side of the cross sectional profile is a hot side and the second side of the cross sectional profile is a cold side.

In another exemplary embodiment of any of the above described flow path components for a gas powered turbine, a cross sectional area of each of the segments normal to an expected fluid flow through the segment is approximately equal.

In another exemplary embodiment of any of the above described flow path components for a gas powered turbine, the cavity is a pass through cavity extending a full radial length of the flow path component.

In another exemplary embodiment of any of the above described flow path components for a gas powered turbine, the cavity extends a partial radial length of the flow path component.

Another exemplary embodiment of any of the above described flow path components for a gas powered turbine further includes at least one coolant purge connecting an aft most segment of the plurality of segments to a flow path, the coolant purge being configured to purge coolant into the flow path.

In another exemplary embodiment of any of the above described flow path components for a gas powered turbine, the coolant purge connects the aft most segment to one of a side of the cross sectional profile opposite the first subset of segments and the trailing edge.

In another exemplary embodiment of any of the above described flow path components for a gas powered turbine, wherein the coolant purge is configured to purge coolant from a cold side of the flow path component body, and wherein the first subset of segments is disposed along a hot side of the flow path component body.

In another exemplary embodiment of any of the above described flow path components for a gas powered turbine, the hot side is opposite the cold side.

Another exemplary embodiment of any of the above described flow path components for a gas powered turbine further includes a third subset of segments fore of the cavity, and configured such that the third subset of segments shields a side of the cavity facing the leading edge.

Another exemplary embodiment of any of the above described flow path components for a gas powered turbine further includes a fourth subset of the segments disposed along the other of the first side and the second side of the cross sectional profile.

In another exemplary embodiment of any of the above described flow path components for a gas powered turbine, the flow path component at least partially spans a flow path in a gas turbine engine.

In another exemplary embodiment of any of the above described flow path components for a gas powered turbine, the flow path component at least partially spans a flow path in a high pressure turbine section of the gas turbine engine.

In another exemplary embodiment of any of the above described flow path components for a gas powered turbine, the flow path component is a double walled component.

In one exemplary embodiment a gas powered turbine engine includes a compressor section, a combustor section fluidly connected to the compressor section via a primary flow path, a turbine section fluidly connected to the combustor section via the primary flow path, a plurality of flow path components at least partially spanning the primary flow path, at least one of the flow path components includes a shielded cavity and a serpentine cooling passage configured to shield at least a first side of the shielded cavity, and the serpentine cooling passage further includes at least one segment spanning the flow path component, the at least one segment including at least one purge configured to purge coolant from the serpentine cooling passage at least one of a trailing edge of the flow path component and a side of the flow path component opposite the first side of the shielded cavity.

In another exemplary embodiment of the above described gas powered turbine engine, each segment of the serpentine cooling passage has an approximately identical cross sectional area.

In another exemplary embodiment of any of the above described gas powered turbine engines, the first side of the shielded cavity is a hot side of the flow path component and wherein the at least one purge is configured to purge coolant from the serpentine cooling passage at a cold side of the flow path component.

An exemplary method for actively cooling a flow path component includes passing a coolant through a first subset of segments of a serpentine cooling passage, thereby shielding a first side of a cavity in a flow path component, passing the coolant through a second subset of segments of the serpentine cooling passage, wherein the second subset of segments spans a hot side to a cold side of the serpentine cooling passage, and purging coolant from the serpentine cooling passage into a flow path on the cold side of the flow path component.

A further example of the above described exemplary method for actively cooling a flow path component includes passing a coolant through a first subset of segments of a serpentine cooling passage includes passing the coolant through at least one segment of the cooling passage defined between an outer wall and an inner wall of a double walled flow path component.

These and other features of the present invention can be best understood from the following specification and drawings, the following of which is a brief description.

DETAILED DESCRIPTION OF AN EMBODIMENT

Figure 1:
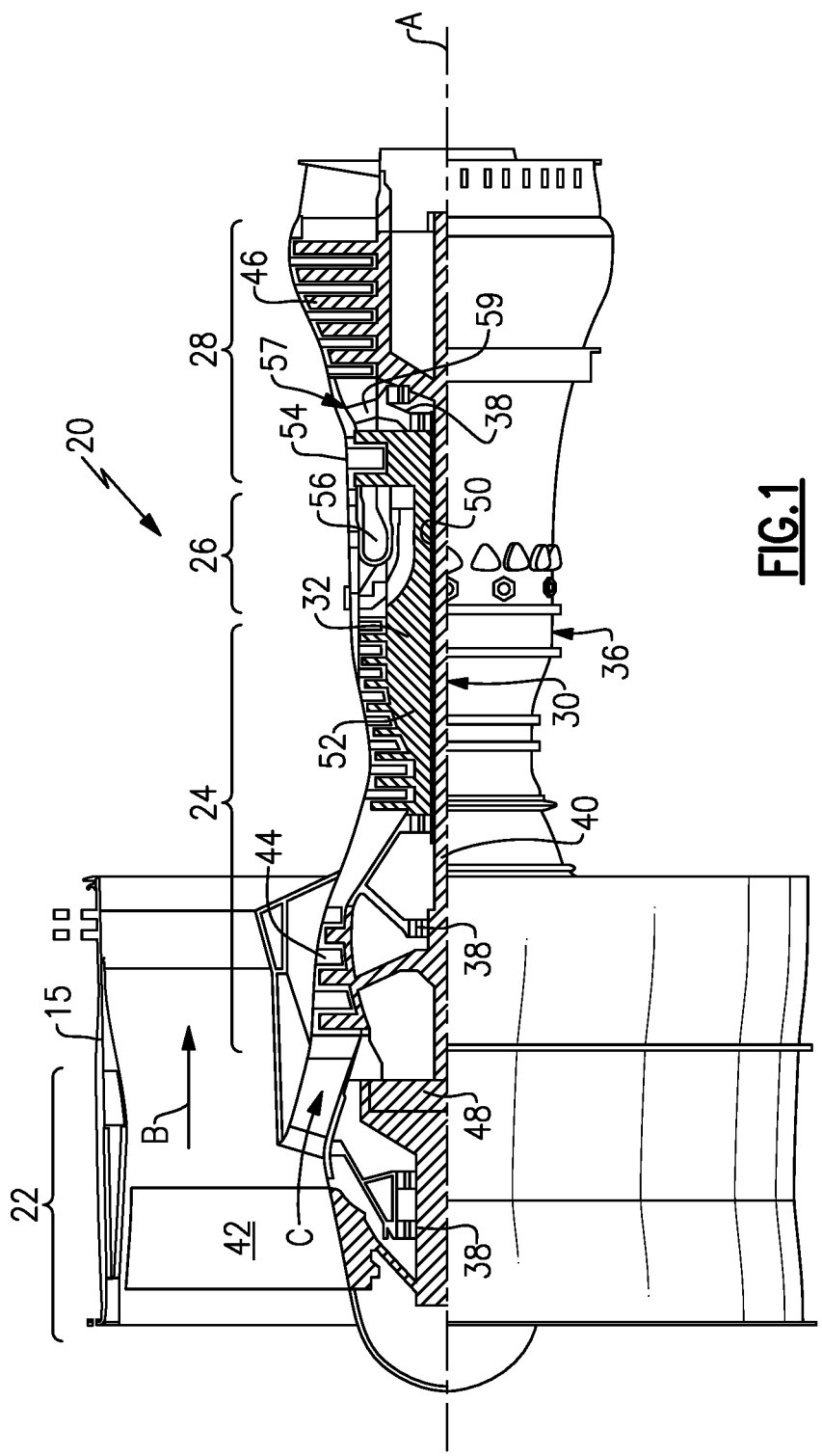
FIG. 1 schematically illustrates a gas turbine engine according to one example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Due to the extreme temperatures reached in the turbine section 28 of the gas turbine engine 20, flow correcting elements, such as vanes, and turbine components spanning or partially spanning the primary flow path (referred to as flow path components) are actively cooled using a cooling feature. One exemplary cooling feature is a serpentine cooling passage including multiple segments that pass through the cooled flow path component. Each of the segments of a serpentine cooling passage is generally radially aligned relative to an axis defined by the gas turbine engine 20, and a cooling fluid passes radially outward along a first segment, then radially inward along a subsequent segment, then radially outward along a subsequent segment, etc. In alternative examples, the cooling fluid passes radially inward along the first segment, then radially outward along a subsequent segment, then radially inward along a subsequent segment, etc. In one particular example, the flow path component is a double walled design providing multiple thin cooling passages between an outer wall and an inner wall on at least one side of the flow path component. The multiple thin cooling passages are interconnected at alternating ends, creating a portion of the serpentine cooling passage through the flow path component.

In certain examples, it can be desirable to include a pass through cavity, or other cavity within the cooled flow path component. It can be desirable to shield the pass through cavity from heat on one or more sides of the cooled flow path component. One system for providing the shielding is illustrated herein using a double walled airfoil design. In existing double walled cooling passages, coolant flowing through the cooling passages is purged (expelled) into the flow path on the side of the flow path component where the passage is located. Purging cooling flow onto a suction side of a flow path component can, in some examples, have undesirable effects on flow through the flow path, thereby rendering effective cooling on the hotter suction side of the flow path component more difficult.

Figure 2:
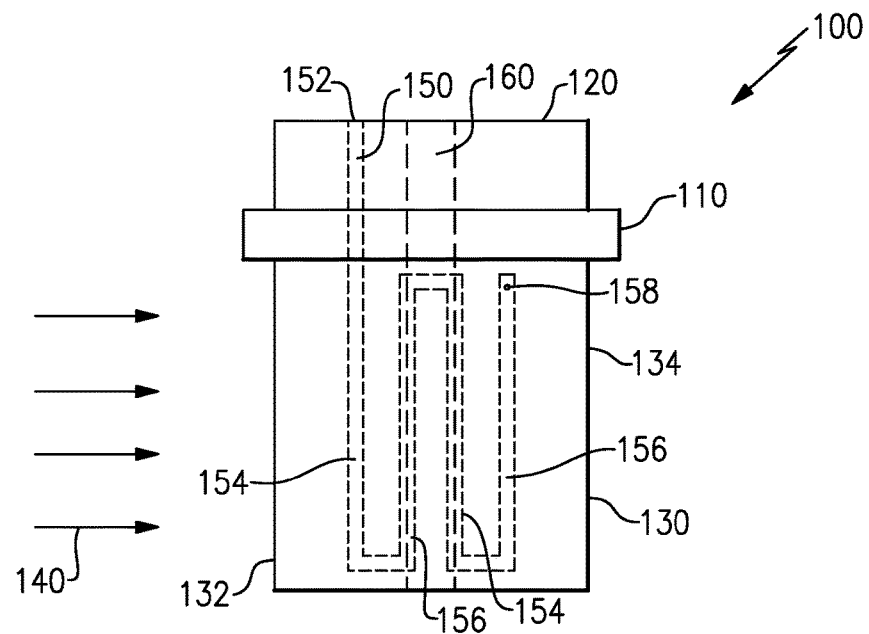
FIG. 2 schematically illustrates a side view of a flow path component having an airfoil profile.

FIG. 2 schematically illustrates an exemplary stator vane 100 for utilization in a turbine section of a gas powered turbine. The stator vane 100 includes a base portion 110, an attachment portion 120, and an airfoil portion 130. In an assembled gas turbine engine, the attachment portion 120 is retained in a corresponding fixture of an engine static structure, with the base portion 110 aligning with an inner diameter or an outer diameter of the primary flow path. The airfoil portion 130 extends radially inward and spans the primary flow path. The length of the flow path component 100 extending radially in an assembled configuration is referred to herein as the "radial length" of the flow path component 100. The physical structure made up of the base portion 110, the attachment portion 120, and the airfoil portion is alternatively referred to as the flow path component body.

A fluid, such as air, passes through the primary flow path along a fluid flow 140 direction. The fluid flow 140 initially contacts a leading edge 132 of the airfoil portion 130. The fluid flow 140 travels across the airfoil portion 130, through the flow path, and passes a trailing edge 134 of the airfoil portion 130. The airfoil portion 130 in the illustrated example includes an airfoil shaped profile along a cross section aligned with a direction of the fluid flow 140.

Cooling air, or another coolant, enters a serpentine cooling passage 150 at a cooling passage inlet 152. The inlet 152 can be any conventional coolant connection, and the cooling passage 150 can utilize any coolant including bleed air from a compressor. The serpentine cooling passage 150 has multiple segments 154, 156 with the coolant flowing radially inward in a first set of the segments 154 and the coolant flowing radially outward in the second set of segments 156. Coolant flowing through the serpentine passage 150 is expelled from a downstream end of the serpentine passage 150 through a purge opening 158. In some examples, the purge opening 158 is positioned on one side of the airfoil portion 130. In other examples, the purge opening 158 can be positioned at the trailing edge 134 of the airfoil portion 130.

Further included interior to the stator vane 100 is a pass through cavity 160. The pass through cavity 160 is a pathway that allows components, or fluids radially outward of the flow path to be passed through the flow path to engine elements radially inward of the flow path. In alternative examples, the pass through cavity 160 allows fluids or components to be passed from radially inward of the flow path to engine elements radially outward of the flow path. In some alternate examples, the pass through cavity 160 can be replaced with a cavity that extends only a partial radial length of the airfoil portion 130 and does not fully span the flow path. Such a cavity is suited for use in a rotor, or other non-static flow path component. One of skill in the art having the benefit of this disclosure, however, will understand that a shielded cavity extending only a partial span of the flow path could also be implemented in any other type of flow path component.

During operation of the gas turbine engine, one side of the airfoil portion 130 is exposed to higher temperature gasses in the flow path than the other side of the airfoil portion 130. The more exposed side is referred to as the hot side, while the less exposed side is referred to as the cold side. In one example, the hot side is a suction side of the airfoil portion 130 and the cold side is a pressure side of the airfoil portion 130. In an alternative example, the hot side is a pressure side of the airfoil portion 130 and the cold side is a suction side of the airfoil portion 130.

In some examples, it is desirable to shield the pass through cavity 160 and prevent the pass through cavity 160 from picking up heat from the primary flow path. In such examples, one or more of the segments 154, 156 of the serpentine cooling passage 150 are positioned between the pass through cavity 160 on the hot side of the stator vane 100. In this example, the flow of coolant through the serpentine cooling passage 150 provides a cooling buffer that shields the pass through cavity 160 from heat in the primary flow-path. While the serpentine cooling passage 150 illustrated in the example of FIG. 2 includes four segments 154, 156, one of skill in the art will appreciate that any number of segments can be utilized.

Figure 3:
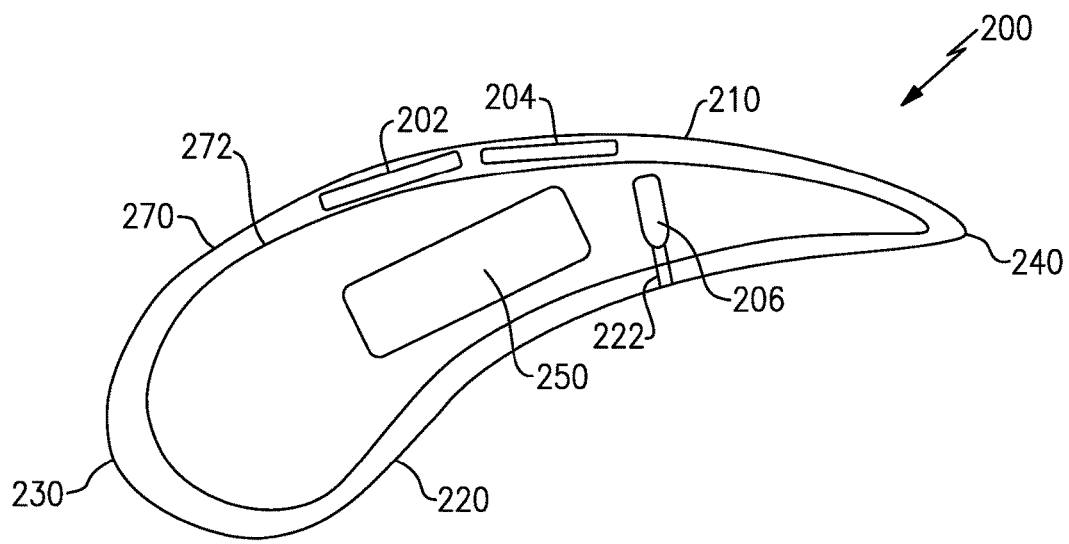
FIG. 3 schematically illustrates a cross sectional view of a first example flow path component.

With continued reference to FIGS. 1 and 2, FIG. 3 illustrates a cross sectional view of an exemplary flow path component 200, such as the stator vane 100 of FIG. 2. The flow path component 200 has an airfoil shaped cross section, with a leading edge 230 and a trailing edge 240. Connecting each of the leading edge 230 and the trailing edge 240 are a suction side and a pressure side. During operation of the gas powered turbine including the flow path component 200, the suction side is a hot side 210 and the pressure side is a cold side 220.

A serpentine cooling passage including multiple segments 202, 204, 206 provides active cooling to the flow path component 200. The serpentine cooling passage includes segments 202, 204 defined between an outer wall 270 of the flow path component 200 and an inner wall 272 of the flow path component 200. Also included within the flow path component 200 is a pass through cavity 250. In an installed configuration, the pass through cavity 250 allows connections between elements of the turbine engine radially inward of the flow path, and elements of the turbine engine radially outward of the flow path. In alternative embodiments, the pass through cavity 250 extends only partially into the flow path, and allows for sensors or other similar components to be disposed within the flow path.

In order to shield the pass through cavity 250 from heat absorbed through the hot side 210 of the flow path component 200, a subset of the segments 202, 204, 206 of the serpentine cooling passage are disposed between the pass through cavity 250 and the hot side 210. While illustrated herein as being shielded by two segments 202, 204 of the serpentine cooling passage, additional or fewer segments 202, 204 can be arranged to provide the shielding effect depending on the dimensions and arrangement of the pass through cavity 250 and the flow path component 200.

The remaining aft segment 206 of the serpentine cooling passage is downstream of the pass through cavity 250, and spans from the hot side 210 to the cold side 220 of the flow path component 200. One or more coolant purge openings 222 connects the remaining aft segment 206 to the cold side 220. By spanning the flow path component 200 from the hot side 210 to the cold side 220 with the aft most segment 206, the serpentine cooling passage can provide a cooling and shielding effect on the hot side 210 of the flow path component 200, and purge coolant from the serpentine cooling passage into the flow path at the cold side 220 of the flow path component 200.

Figure 4:
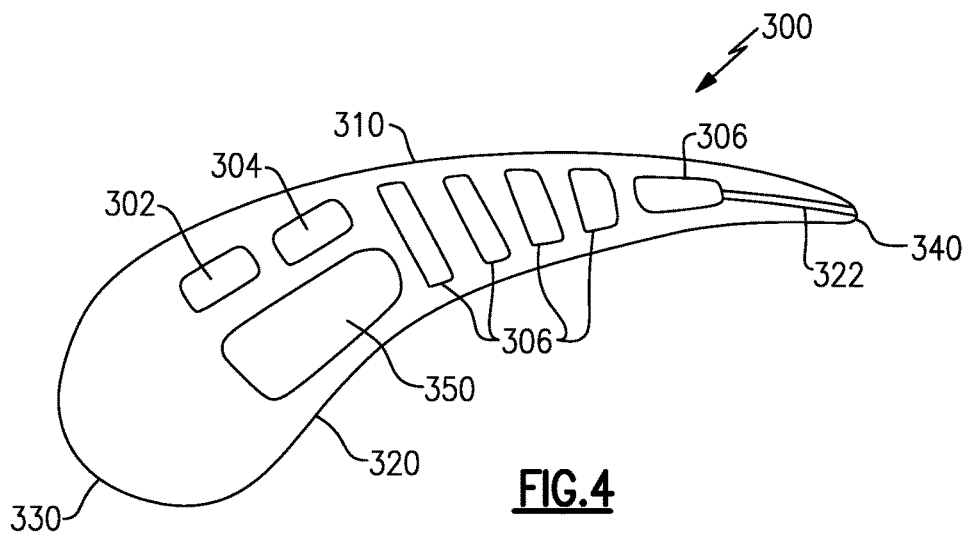
FIG. 4 schematically illustrates a cross sectional view of a second example flow path component.

With continued reference to FIG. 3, and with like numerals indicating like elements, FIG. 4 illustrates flow path component 300 that is a modified version of the flow path component 200 illustrated in FIG. 3. The flow path component 300 includes a leading edge 330 and a trailing edge 340. A pressure side (referred to as the hot side 310) and a suction side (referred to as the cold side 320) connects the leading edge 330 to the trailing edge 340. The flow path component 300 includes a serpentine cooling passage constructed of multiple segments 302, 304, 306 and a shielded cavity 350.

A subset of the segments 302, 304 of the serpentine cooling passage are positioned between the shielded cavity 350 and the hot side 310 and provide the buffering and shielding effect described with regards to the example of FIG. 3. In place of the single remaining aft segment 206, illustrated in the example of FIG. 3, the example of FIG. 4 utilizes multiple aft segments 306, aft of the shielded cavity 350, with each of the aft segments 306 spanning the hot side 310 to cold side 320 of the flow path component 300. The inclusion of additional aft segments 306 in the serpentine cooling passage allows the serpentine cooling passage to further cool the flow path component 300.

As the additional aft segments 306 extend into a trailing edge 340 region of the flow path component 300, one or more coolant purges 322 connect the aft most aft segment 306 of the serpentine cooling passage to the trailing edge 340, and the coolant is purged out of the serpentine cooling passage into the flow path downstream of the flow path component 300.

Figure 5:
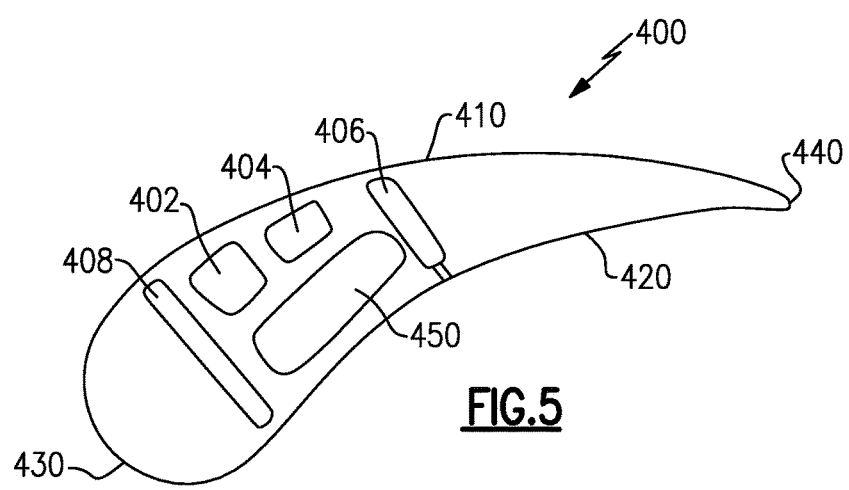
FIG. 5 schematically illustrates a cross sectional view of a third example flow path component.

In yet further examples, the shielded cavity 350 can require shielding on additional sides beyond the hot side 310. With continued reference to FIGS. 3-4, and with like numerals indicating like elements, FIG. 5 illustrates a further example flow path component 400 including a shielded cavity 450 that is shielded on a hot side 410 of the flow path component 400 and shielded on a side of the shielded cavity 450 facing a leading edge 430 of the flow path component 400. As with the previous examples, the serpentine cooling passage includes multiple segments 402, 404, 406, 408 with the segments 402, 404, 406, 408 alternating in flow direction between radially outward flow and radially inward flow. In the example of FIG. 5, however, the flow path component 400 includes a fore initial segment 408, or subset of segments fore of the shielded cavity 450. The fore initial segment 408 subset spans the hot side 410 and the cold side 420 of the flow path component 400, and connects with the first shielding segment 402. While included in the body of the flow path component 200 instead of the double wall structure at the exterior of the flow path component 200, the fore initial segment 408 provides shielding to the side of the shielded cavity 450 facing the leading edge 430 in the same manner as the previously described shielding.

Figure 6:
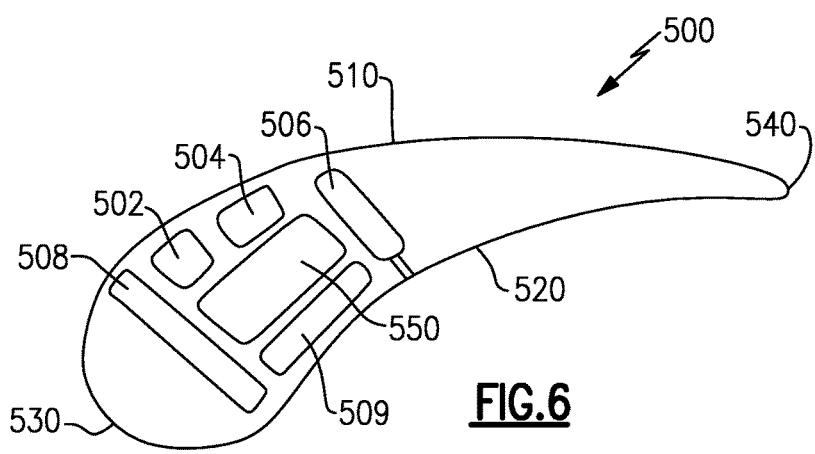
FIG. 6 schematically illustrates a cross sectional view of a fourth example flow path component.

In yet further examples, heat from the flow path can be absorbed into the flow path component through a cold side as well as a hot side. With continued reference to FIGS. 3-5, and with like numerals indicating like elements, FIG. 6 illustrates one such component 500. As with the example of FIG. 5, The flow path component 500 includes a leading edge 430 and a trailing edge 440, with the leading edge 430 being connected to the trailing edge 440 via a hot side 510 and a cold side 520. In addition to the serpentine cooling passage segments 502, 504, 506, 508, included in previous examples, the serpentine cooling passage includes one or more cold side segments 509. The cold side segments 509 buffer the side of the shielded cavity 550 facing the cold side 520 of the flow path component 500 in the same manner as the hot side segments 502, 504 buffer the side of the shielded cavity 550 facing the hot side 510.

In some examples, the cold side segments 509 are downstream of the hot side shielding segment 502, 504 as the cooling and buffering needed on the cold side 520 of the shielded cavity 550 is less than the cooling and buffering needed by the hot side 510 of the shielded cavity 550. In such examples, the segments 509 of the serpentine cooling passage on the cold side 520 of the shielded cavity 550 are positioned downstream of the segments 502, 504 of the serpentine passage on the hot side 510 of the shielded cavity 550, and upstream of the aft segments 506 of the serpentine cooling passage.

In each of the above listed examples, each segment of the serpentine cooling passage has approximately the same cross sectional area as each other segment, accounting for manufacturing tolerances. By ensuring that each segment of the serpentine passage has approximately the same cross sectional area as each other segment, localized acceleration or deceleration of the coolant flowing through the serpentine cooling passage is avoided, and consistent cooling and buffering throughout the flow path component can be ensured.

While illustrated in FIGS. 4-6 as a highly schematic airfoil profile, one of skill in the art will appreciate that the illustrated flow path components 300, 400, 500 of FIGS. 4-6 utilize a double walled construction, and the illustrated segments of the serpentine cooling passage are exaggerated for illustrative effect. Further, while described and illustrated above with regards to a stator vane within a turbine section, one of skill in the art having the benefit of this disclosure will appreciate that the flow path component can be any double walled flow path component having a hot side and a cold side, and is not limited to stator vanes, blades, or other components having an airfoil shaped profile.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A flow path component for a gas powered turbine comprising:
   a flow path component body having cross sectional profile having a leading edge and a trailing edge, the leading edge being connected to the trailing edge by a first side and being connected to the trailing edge by a second side opposite said first side;
   a serpentine cooling passage including a plurality of segments, each of said segments being generally radially aligned, wherein a first subset of said segments disposed along one of said first side and said second side of said cross sectional profile, and a second subset of said segments spans the flow path component body from said first side to said second side, and wherein only an aftmost segment of the serpentine cooling passage includes at least one coolant purge;
   a cavity internal to said flow path component body, wherein said cavity is at least partially shielded from one of said first side and said second side by at least one of said plurality of segments; and
   the at least one coolant purge connecting a downstream end of the aftmost segment of the serpentine cooling passage to the flow path and configured to purge coolant from the flow path component on a cold side of said flow path component body.

2. The flow path component of claim 1, wherein said cross sectional profile is an airfoil profile, and said second side of said cross sectional profile is a suction side and said first side of said cross sectional profile is a pressure side.

3. The flow path component of claim 1, wherein said first side of said cross sectional profile is a hot side and said second side of said cross sectional profile is a cold side.

4. The flow path component of claim 1, wherein a cross sectional area of each of said segments normal to an expected fluid flow through said segment is approximately equal.

5. The flow path component of claim 1, wherein said cavity is a pass through cavity extending a full radial length of said flow path component.

6. The flow path component of claim 1, wherein said cavity extends a partial radial length of said flow path component.

7. The flow path component of claim 1, wherein said coolant purge connects said aft most segment to a side of said cross sectional profile opposite said first subset of segments, and wherein said first subset of segments is disposed along a hot side of said flow path component body.

8. The flow path component of claim 7, wherein said hot side is opposite said cold side.

9. The flow path component of claim 1, further comprising a third subset of segments fore of said cavity, and configured such that said third subset of segments shields a side of said cavity facing said leading edge.

10. The flow path component of claim 1, further comprising a fourth subset of said segments disposed along the other of said first side and said second side of said cross sectional profile.

11. The flow path component of claim 1, wherein the flow path component at least partially spans a flow path in a gas turbine engine.

12. The flow path component of claim 11, wherein the flow path component at least partially spans a flow path in a high pressure turbine section of said gas turbine engine.

13. The flow path component of claim 1, wherein the flow path component is a double walled component.

14. A gas powered turbine engine comprising:
   a compressor section;
   a combustor section fluidly connected to said compressor section via a primary flow path;
   a turbine section fluidly connected to the combustor section via the primary flow path;
   a plurality of flow path components at least partially spanning said primary flow path, at least one of the flow path components includes a shielded cavity and a serpentine cooling passage configured to shield at least a first side of the shielded cavity, wherein the first side of the shielded cavity is a hot side and a second side of the shielded cavity, opposite the first side of the shielded cavity, is a cold side; and
   the serpentine cooling passage further includes at least one segment spanning said flow path component, the at least one segment including at least one purge configured to purge coolant from said serpentine cooling passage at a side of the flow path component opposite the first side of the shielded cavity, the side of the flow path component corresponding to the second side of the shielded cavity, and wherein only an aftmost segment of the serpentine cooling passage includes at least one coolant purge.

15. The gas powered turbine engine of claim 14, wherein each segment of said serpentine cooling passage has an approximately identical cross sectional area.

16. The gas powered turbine engine of claim 14, wherein the first side of the shielded cavity is a hot side of the flow path component and wherein said at least one purge is configured to purge coolant from said serpentine cooling passage at a cold side of said flow path component.

17. A method for actively cooling a flow path component comprising:
   passing a coolant through a first subset of segments of a serpentine cooling passage, thereby shielding a hot side of a cavity in a flow path component;
   passing said coolant through a second subset of segments of the serpentine cooling passage, wherein the second subset of segments spans a hot side to a cold side of the serpentine cooling passage; and purging coolant from the serpentine cooling passage into a flow path on the cold side of the flow path component from a downstream end of an aftmost segment of the serpentine passage, and wherein only the aftmost segment of the serpentine cooling passage includes at least one coolant purge.

18. The method of claim 17, wherein passing a coolant through a first subset of segments of a serpentine cooling passage includes passing the coolant through at least one segment of the cooling passage defined between an outer wall and an inner wall of a double walled flow path component.

* * * * *